United States Patent [19]
Perry et al.

[11] Patent Number: 6,127,443
[45] Date of Patent: Oct. 3, 2000

[54] ENERGY MANAGEMENT POLYURETHANE RIGID FOAMS WITH HIGH RECOVERY

[75] Inventors: Mark J. Perry, Hurricane; James L. Lambach, Charleston; Frank E. Critchfield, South Charleston, all of W. Va.

[73] Assignee: Bayer Antwerp N.V., Antwerp, Belgium

[21] Appl. No.: 09/187,869

[22] Filed: Nov. 6, 1998

[51] Int. Cl.[7] ................................. C08J 9/04; C08L 75/04
[52] U.S. Cl. ........................ 521/137; 521/170; 521/174; 521/176
[58] Field of Search .................... 521/137, 170, 521/174, 176

[56] References Cited

U.S. PATENT DOCUMENTS

| | | | |
|---|---|---|---|
| 4,116,893 | 9/1978 | Flanagan | 521/137 |
| 4,134,610 | 1/1979 | Lindewall | 521/167 |
| 4,190,712 | 2/1980 | Flanagan | 521/137 |
| 4,212,954 | 7/1980 | Nomura et al. | 521/159 |
| 4,282,330 | 8/1981 | Austin | 521/118 |
| 5,143,941 | 9/1992 | Rossio et al. | 521/51 |
| 5,167,941 | 12/1992 | Bedell | 423/242.2 |
| 5,187,204 | 2/1993 | Jackson et al. | 521/111 |
| 5,216,041 | 6/1993 | Rossio et al. | 521/137 |
| 5,248,703 | 9/1993 | Krueger et al. | 521/125 |
| 5,248,704 | 9/1993 | Rossio et al. | 521/137 |
| 5,453,455 | 9/1995 | Krueger et al. | 521/125 |
| 5,580,651 | 12/1996 | Kerman | 428/318.4 |
| 5,919,395 | 7/1999 | Bastin et al. | 252/182.24 |

*Primary Examiner*—Rabon Sergent
*Attorney, Agent, or Firm*—Brooks & Kushman P.C.

[57] ABSTRACT

Energy absorbing rigid polyurethane foams have both high energy absorbing efficiency as well as exceptional recovery after deformation, allowing their use in visible energy absorbing structures, particularly in the transportation vehicle industry. The foams are prepared by reaction of one or more di- or polyisocyanates with a polyol component containing both high and low molecular weight polyols, and optionally chain extenders, crosslinkers, and other additives, wherein at least one polyol is a polymer polyol such that the total vinyl polymer solids content of the foam is greater than 15 weight percent.

16 Claims, No Drawings

ENERGY MANAGEMENT POLYURETHANE RIGID FOAMS WITH HIGH RECOVERY

TECHNICAL FIELD

The present invention is directed to rigid polyurethane energy management foams which exhibit both high energy management efficiency and high recovery, and to reactive systems suitable for their preparation.

BACKGROUND ART

Energy management foams are generally considered foams which compress upon impact so as to absorb considerable impact energy over a relatively long time period. Such foams have been increasingly important in the passenger compartment of transportation vehicles, and may be found in arm rests, head rests, pillars, roof rails, dashboards, knee bolsters, side bolsters, bumpers, and the like. Many of these parts are visible to the occupant, being covered with polyvinyl, fabric, or leather trim materials.

The energy managed, EM, is the integral of the force (F) versus deflection curve up to a compression limit of 40%:

$$EM = \int_o^d F(x)dx$$

where d=deflection at 40% compression.

Energy management foams must also be efficient. Energy management efficiency, E, reflects the difference between an ideal square wave energy, the product of force and deflection, and the energy managed. E, in percent, is defined as $$E = [EM(d)/F(d) \cdot d] \cdot 100,$$

or $$E = \frac{\int_o^d F(x)dx}{F(d) \cdot d} \cdot 100$$

Flexible foams are not efficient energy absorbers, and virtually all energy management applications in vehicle interiors employ rigid polyurethane foam. Typical of formulations used to produce such foams are U.S. Pat. Nos. 5,143,941; 5,187,204; 5,248,703; 5,248,704; and 5,453,455, and the patents cited therein. For example, U.S. Pat. No. 5,143,941 discloses rigid polyurethane foams which are water blown and exhibit a relatively constant strength to crush. While such foams are excellent energy absorbing foams, their energy absorption is due to irreversibly deforming and breaking the foam cell walls during compression. Thus, following impact, such foams are unable to recover their initial shape. More importantly, the crushed foam is unable to again provide energy management. This defect is exceedingly important should a severe impact later occur. It must be stressed that the loss of energy management ability may occur from only incidental or mild repeated contact.

In the foregoing patents, typical formulations require special polyols derived from the oxyalkylation of toluene diamine or ethylene diamine, or, in the case of U.S. Pat. No. 5,453,455, the use of lithium salts or formic acid, (both environmentally suspect). Polymer polyols are somewhat uniformly disclosed as unsuitable in these references in any concentrations. See, for example, U.S. Pat. No. 5,143,941 in this regard.

U.S. Pat. No. 5,216,041 is directed to similar energy absorbing foam compositions wherein minor amounts of polymer polyols are included along with amine-based polyols. However, the '041 patent indicates that when more than 30% by weight of polymer polyols are used, the foams fail as energy absorbing foams. For the polymer polyols employed (40% solids), 30% polymer polyol corresponds to an upper total solids limit of less than 10 weight percent in the overall formulation.

U.S. Pat. Nos. 4,116,893 and 4,212,954 disclose energy management foams with a decreased temperature dependence on energy absorption efficiency. Both patents employ polymer polyols together with relatively large amounts (in equivalents) of low molecular weight crosslinkers such as ethylene glycol, diethylene glycol, 1,4-butanediol, trimethylolpropane, and the like. The '893 patent adopts a prepolymer approach which is not optimal due to the extra expense in preparing the isocyanate-terminated prepolymers. The use of relatively large molar equivalents of low molecular weight chain extenders increases the isocyanate requirement, which further increases costs. Total polymer solids in both patents are very limited, following the teachings of U.S. Pat. Nos. 5,143,941; and 5,216,041. In the '893 patent, typical formulations employ about 8 weight percent polymer solids, while in the '954 patent, about 10.8 weight percent polymer solids are employed.

The result of the irreversible crushing of the rigid energy management foams of the prior art from an aesthetic point of view is that the surface of the door panel, dashboard, etc., will appear permanently dented or deformed. Many such parts, e.g., dashboards, are very expensive to replace. In the case of side bolsters, which are encased within the vehicle door, impact damage may not be visible to the occupant. There is a high probability, however, that upon replacement of door panels damaged in an accident, that the side bolsters, which are generally poured-in-place at the factory, will not be replaced. Thus, the repaired vehicle will no longer meet safety requirements, unknown to the owner. Again, it must be stressed that foams without high recovery can be crushed even by relatively minor impact, compromising the ability of the foam to absorb energy in severe impacts.

DISCLOSURE OF THE INVENTION

The subject invention is directed to improved energy management foams which not only exhibit excellent energy absorbing efficiency, but also exhibit excellent recovery. The subject invention energy management foams are prepared by reacting particular polymer polyols with an isocyanate component to generate rigid polyurethane foam, wherein the total polymer solids content of the formulation exceeds 15 weight percent.

BEST MODE FOR CARRYING OUT THE INVENTION

The energy management foams of the subject invention are rigid, predominately open celled foams having core densities of from about 30 Kg/m$^3$ to about 270 Kg/m$^3$. In certain cases, energy management foams having core densities less than 30 Kg/m$^3$ may be useful as well. However, the energy managed by the energy management foams of the subject invention is highly density dependent, with foams of lesser density capable of only relatively low energy management, although efficiency may remain high.

The energy management foams of the subject invention are characterized by both high efficiency as well as high recovery. The sum of the efficiency and recovery will be greater than 150, when both are expressed as percents. Preferably, recovery is greater than 80%, more preferably greater than 90%, and most preferably 95% or more. Efficiency is generally greater than 75%, and is preferably greater than 80%.

The polyurethane foams of the subject invention are prepared by reaction of an isocyanate component with a polyol component. While prepolymer techniques, where all or a portion of polyol is first reacted with isocyanate to form an isocyanate-terminated prepolymer may be used, it is preferable to employ one shot processing. Thus, although not preferable, in the discussion of polyol and isocyanate which follows, a portion or all of the polyol component may be reacted with the isocyanate to form an isocyanate terminated prepolymer, which may then be reacted with additional polyol and/or chain extender, crosslinkers, etc., and water as a blowing agent.

The polyol component of the subject polyurethane foams is at least bicompositional, having at least one high molecular weight portion and one low molecular weight portion. The polyol component must also contain sufficient dispersed polyacrylonitrile/styrene polymer polyol solids so as to result in minimally about 15 weight percent vinyl polymer solids in the foam, preferably 20% or more, more preferably 25% or more, with the range of 25% to 30% being especially useful. By the term "polymer polyol" is meant a polyoxyalkylene polyether polyol having stably dispersed therein, particles of vinyl polymer solids. These polymer polyols are prepared by methods well known to the skilled artisan, generally by the in situ polymerization of vinyl monomers in the polyol. Preferred vinyl monomers are acrylonitrile and styrene. Other monomers include vinyl chloride, vinylidene chloride, methylmethacrylate, p-methylstyrene, and the like.

The bicompositional polyol component is preferably prepared by blending two polymer polyol components having different molecular weights and/or functionalities. The first polyol component will have a minimum average nominal functionality of about 2.5 and an equivalent weight such that the minimum number average molecular weight is about 3000 Da. Please note that unless indicated otherwise, all molecular weights expressed herein are number average molecular weights. The first polyol is generally a polymer polyol prepared by the in situ polymerization of acrylonitrile and styrene having a styrene/acrylonitrile ratio of greater than 50/50. Preferably, the dispersed vinyl polymer solids content is about 20 weight percent or more, more preferably at least 30 weight percent, and most preferably in the range of 35 to 50 weight percent. As is also the case with the second and other polyols used herein, the polyether polyols of the first polyol component may be a conventional polyol prepared by base catalysis, or may be a low unsaturation polyol prepared by catalytic methods known to the art which reduce the intrinsic (unavoidable) unsaturation to below 0.040 meq/g, more preferably less than 0.020 meq/g, and most preferably below 0.010 meq/g. Examples of catalysts which may be used to produce low levels of unsaturation are double metal cyanide complex catalysts.

The first polyol component will have a nominal functionality of about 2.5 or more. By "nominal functionality" is meant the theoretical functionality which would result by oxyalkylation of the initiator (starter) molecules without formation of intrinsic unsaturation. For example, polyoxyalkylation of glycerine (functionality of 3.0) would result in a polyol having a nominal functionality of 3. In actuality, unless low unsaturation-producing catalysts are employed, the actual (measured) functionality will be considerably less. For example, in a 6000 Da molecular weight polyoxypropylene triol prepared by oxypropylating glycerine in the presence of potassium hydroxide as oxyalkylation catalyst, actual functionalities in the range of 2.5 to 2.7 are routinely achieved. However, the nominal functionality is still 3.

The nominal functionality of the first polyols is, as stated, minimally 2.5, which may be achieved through use of a mixture of difunctional and trifunctional initiators. Alternatively, the first polyol may be produced by blending together two or more polyols, for example a polyoxypropylated diol (nominal functionality of 2) and a polyoxyalkylated triol (nominal functionality of 3). Blends of two- and four-functional polyols as well as other blends are also suitable. Such blends preferably do not contain purposefully added polyols which have a nominal functionality of 1, as these polyols may function as chain terminators during polyurethane formation, limiting both molecular weight and crosslink density. The first polyol component consists of all polyols having molecular weights of greater than 3000 Da regardless of functionality. The average nominal functionality should be greater than 2.5, preferably 3.0 or more, and preferably less than 8, more preferably less than 6.

Most preferably, at least one of the individual polyols contained in the first polyol component will be a polymer polyol. Non-limiting examples of first polyol components are 1) a polyoxyalkylated mixture of dipropylene glycol and sorbitol having an equivalent weight of 2000 Da; 2) a glycerine-initiated, KOH-catalyzed polyoxypropylene triol having a molecular weight of 6300 Da and an unsaturation of 0.06 meq/g, containing 43 weight percent of 50/50 acrylonitrile/styrene polymer solids as a dispersed phase; 3) a blend of 40 mol percent of a polyoxypropylene diol polymer polyol containing 30 weight percent vinyl polymer solids and 60 mol percent of a polypropylene triol containing 43% vinyl polymer solids.

The polyols of the first polyol component are preferably substantially polyoxypropylene polyols, i.e., they contain in excess of 50 mol percent oxypropylene moieties based on total oxyalkylene moieties. Of the non-oxypropylene moieties, the remainder are preferably substantially oxyethylene moieties, present either internally or as a cap. Other oxyalkylene moieties which may be useful, but are generally not preferred due to their higher cost, are those derived from 1,2-butylene oxide, 2,3-butylene oxide, oxetane, tetrahydrofuran, halogenated alkylene oxides, cyclohexene oxide, styrene oxide, and the like. Most preferably all the polyols of the subject invention are homopolymers or copolymers prepared by oxyalkylating a suitable initiator with propylene oxide, ethylene oxide, or their mixtures, as homopolymers, or in block, random, or block random fashion. Polyoxypropylene polyols which have internal blocks of homopolyoxypropylene or random poly(oxypropylene/oxyethylene), and external polyoxyethylene caps are most preferred.

The polymer polyols should contain vinyl polymer solids having 50% or more styrene-derived moieties. Polymer polyols with higher acrylonitrile content, i.e., 67/33 acrylonitrile/styrene ratios, may be used provided that the vinyl polymer solids as a whole meet the greater than 50/50 styrene/acrylonitrile ratio. For polymer polyols which contain moieties derived from other vinyl monomers, e.g., methylmethacrylate, vinylidene chloride, etc., these are calculated as if they were styrene.

The second polyol component is a low molecular weight polyoxyalkylene polyol having a hydroxyl number of about 160 to 800 and a nominal functionality of 3.0 to 6.0, preferably a hydroxyl number from 240 to about 600. The second polyol may have the oxyalkylene moiety types and distribution of the first polyols, and, as with the first polyols, are preferably polymer polyols containing up to about 50–60 weight percent vinyl polymer solids, most preferably 10% to 45% polymer solids, and more preferably about 20 weight percent vinyl polymer solids. The second polyol component, like the first polyol component, may comprise a blend of two or more individual polyols. The second polyol component will include all polyols in the total polyol component with hydroxyl numbers in the range of 160 to 800 and functionalities of 3.0 to 6.0.

The first and second polyol components may be blended together to form a unitary polyol component, or may actually be prepared together by processes such as delayed co-initiation. For example, while employing basic catalysis, a blend of propylene glycol and glycerine initiators may be oxypropylated to moderate to high molecular weight, and then additional glycerine added followed by further oxyalkylation. As oxyalkylation by basic catalysis is substantially non-preferential, a bicompositional polyol will be produced which would, upon analysis by GPC, show a polyol species distribution similar to that obtained by blending separately prepared first polyols and second polyols. The higher molecular weight fraction ($\geq 3000$ Da) of such polyols will constitute the first polyol component as claimed herein, while the lower weight components having functionalities of 3.0 to 6.0 will constitute the second polyol component.

The first and second polyols may be blended together prior to reaction with isocyanate or may be employed as separate streams in the one shot process. The second polyol component is present to the extent of about 1 weight percent to about 40 weight percent based on total polyol, more preferably 3 weight percent to 30 weight percent, and most preferably about 5 weight percent to about 20 weight percent.

In addition to the first polyol component and the second polyol component, the reactive mixture generally contains other isocyanate-reactive species. These include chain extenders, crosslinkers, cell modifying additives, non-vinyl polymer particles, etc.

Chain extenders are isocyanate-reactive molecules having molecular weights below 300 Da and equivalent weights below 70 Da. Examples of hydroxyl-functional chain extenders include ethylene glycol, diethylene glycol, triethylene glycol, propylene glycol, dipropylene glycol, tripropylene glycol, glycerine, trimethylolpropane, tetrakis-[hydroxyalkyl]alkylene diamines such as N,N,N',N'-tetrakis[2-hydroxyethyl or 2-hydroxypropyl]ethylene diamines, diethanolamine triethanolamine, and the like. Amino-functional chain extenders are less preferred, as these introduce urea groups into the foam which reduces recovery, and in general increases hardness. Examples of amino-functional chain extenders are ethylene diamine, propylene diamine, 1,6-diaminohexane, and the like. Aromatic amines, particularly sterically hindered diamines such as the various ethyltoluenediamines, alkyl-substituted methylendianilines, etc., are useful, as well as electronically deactivated amines such as methylenebis(o-chloroaniline). Mixed hydroxyamines such as mono-ethanolamine and mono-propanolamine may also be useful. Chain extenders which have reactive functionalities greater than two are generally termed "crosslinkers" rather than "chain extenders". The terminology is not distinct. In the present application difunctional reactive species will be considered chain extenders, and tri- and higher functional species (all of low molecular weight) will be considered crosslinkers. A primary amino group is considered a single functional group for these purposes.

The compositions also generally include catalysts which promote the reaction between hydroxyl groups and isocyanate groups to form urethane linkages, herein termed "polyurethane catalysts". Common catalysts include a variety of tin compounds and organometallic compounds in general. Such catalysts are well known and include dibutyltin diacetate, dibutyltin dilaurate, diethyltin diacetate, tin octoate, and the like, nickel acetylacetonate (delayed action catalyst), etc. Bismuth compounds are particularly active catalysts.

Tertiary amines are also useful catalysts. In addition to catalysis of the urethane-forming reaction, tertiary amines catalyze the reaction of water with isocyanates, the "blowing reaction" in water-blown systems. Examples of tertiary amine catalysts include triethylenediamine and diethylene triamine.

The foamable compositions are generally inherently stable, and therefore do not require a foam stabilizing surfactant. However, cell opening surfactants are suitable for use herein, and numerous additional surfactants are available, and are well known in the art. Silicone surfactants, particularly polyoxyalkylenesilicone copolymer surfactants are commonly used. A preferred surfactant, when one is used, is L-3802 surfactant, available from Witco.

Additional ingredients include pigments, fillers, rheology control additives, dyes, plasticizers, organic (volatile) blowing agents, and other additives well known to the polyurethane art. Reference may be had to Frisch, Saunders and, POLYURETHANES: CHEMISTRY AND TECHNOLOGY, Wiley Interscience, and THE POLYURETHANES HANDBOOK, Gunter Oertel, Ed., Springer Verlag.

The isocyanate component may be any isocyanate commonly used, including modified isocyanates, and less preferably, isocyanate-functional prepolymers and quasi-prepolymers. Suitable isocyanates may be found listed in U.S. Pat. No. 5,216,041. Preferred isocyanates are aromatic di- and polyisocyanates and their urea-, uretonimine-, carbodiimide-, uretdione-, allophanate-, urethane-, biuret-, and isocyanurate-modified analogs. Preferably used are 2,2'-, 2,4'-, and 4,4'-methylenediphenylene diisocyanate (MDIs) and their mixtures, as well as polyphenylene polymethylene polyisocyanates (polymeric MDI) which generally consists of two, three, four, and higher ring analogs of MDI. Of the modified isocyanates, urethane- and carbodiimide-modified MDI are preferable. Aliphatic isocyanates may be used, but are not preferable due to their generally slower reactivity. Isocyanates such as 2,4- and 2,6-toluene diisocyanates and their mixtures, particularly 80:20 and 65:35 mixtures which are commercially available may be used, but are not preferred.

When the isocyanate is employed in the form of a prepolymer or quasi-prepolymer, the isocyanate (excess) is reacted with all or a portion of the isocyanate-reactive species exclusive of water, either solely by heating, or with the assistance of a polyurethane catalyst.

The polyols, chain extenders, additives, isocyanates, etc., are mixed together and introduced generally into an open or closed mold. The mixing may take place entirely in the mixhead, i.e., using a multi-stream, high pressure mixhead, or the isocyanate-reactive components and isocyanate components may be separately blended into respective A (iso) and B (resin) sides, and mixed in the mixhead. Water is generally included as a reactive blowing agent, for example in amounts of from about 0.1 weight percent or lower relative to the total weight of the ingredients, to about 2 weight percent or higher. Preferably, water is employed in amounts of about 0.1 weight percent to about 2 weight percent, more preferably 0.2 weight percent to about 1.5 weight percent. Foam densities are preferably in the range of 270 kg/m$^3$ to about 30 kg/m$^3$, more preferably 200 kg/m$^3$ to 50 kg/m$^3$, and most preferably about 65 kg/m$^3$.

The foams should have compressive strengths in the range useful for energy absorbing applications, i.e., from about 50 kPa to about 2000 kPa, preferably 50 kPa to 1500 kPa, and more preferably about 70 kPa to 1000 kPa.

The efficiency and recovery of the foam are key factors in foam performance. Factors such as compressive strength, energy managed, compression, etc., are measured by or calculated from measurements of foam properties according to ASTM D-1621 "Standard Test Method For Compressive Properties of Rigid Cellular Plastics". The test methodology employs an Instron Model 55R 112S with a 100 kN load cell. Crosshead speed is 2.54 mm/min per 25.4 mm of sample thickness. Samples were nominal 101.6 mm×101.6 mm×25.4 mm. All sample length and width dimensions were measured to three significant digits using Mitutoyo Digimatic™ calipers, and thickness measurements made using a Mitutoyo Digimatic™ Indicator type IDF-150E. All samples are conditioned for at least 40 hr. at 23° C. and 50% relative humidity prior to testing under standard laboratory conditions. The Instron tester collects force or load data continuously during deflection such that force (N) is collected versus deflection (mm).

Compressive strength (kPa) is calculated from the force divided by the sample cross-sectional area. Compression (%) is calculated from the deflection divided by the original sample thickness multiplied by 100. Sample compression continues to 80% or until the load limit of the instrument is reached. The reference for reporting compressive strength is 40% compression. Recovery, R, (%) is calculated from the sample thickness measured 5 minutes after compression to 80% divided by the original sample thickness multiplied by 100.

The energy management foams of the subject invention will have percent recoveries in excess of 80%, while having efficiencies greater than 70%. Thus, the sum of recovery and efficiency, both expressed as a percentage as defined previously, will always be greater than 150, while the recovery is minimally 80. Preferably, the recovery is minimally 90, and the sum of efficiency and recovery is greater than 170, more preferably close to 180 or higher.

The subject invention curable foam compositions may be used in a variety of ways. For example, side bolsters for automobiles may be prepared by introducing the foamable composition into a sheath, tube, etc., which is subsequently bolted into the vehicle door interior. More frequently, the foamable composition is poured-in-place into a door cavity adapted to receive it. Parts or components such as head rests, arm rests, etc., may be prepared by lining a mold with suitable trim cover material, such as leather-look vinyl, woven fabric, i.e., nylon, polypropylene, polyester, etc., or leather, and the foam poured (injected) and allowed to foam. Alternatively, the foamable composition may be introduced into a mold and cured, then covered with trim material following demolding. The energy management foams are suitable, in general, for any manufactured component which vehicle occupant may be expected to contact, either in routine use, i.e entry and exit of loading of a vehicle, or in the case of a crash. Non-limiting examples are dashboards, sun visors, arm rests, door pillars, head rests, center consoles, knee bolsters, ceilings, and the like.

Having generally described this invention, a further understanding can be obtained by reference to certain specific examples which are provided herein for purposes of illustration only and are not intended to be limiting unless otherwise specified.

EXAMPLES 1–5, COMPARATIVE EXAMPLES C1 AND C2

Rigid, energy absorbing foams are prepared by mixing together the respective reactive ingredients in a high pressure mixhead or with a high speed rotational agitator and introducing the thoroughly mixed stream into a mold and allowing the mixture to foam. Following thorough cure, test plaques are cut from the center of the foam as described previously, and tested for energy absorbing characteristics.

In the examples which follow, Polyol A is a 43% solids, KOH catalyzed, glycerin initiated polyol having a 20 weight percent polyoxyethylene cap, available from Lyondell Chemical Co. as Flexure™ 3000 polymer polyol. The polymer solids are 63:37 styrene/polyacrylonitrile polymerized in situ. Polyol A, the base polyol of which has a hydroxyl number of 35.7, is a high molecular weight polyol in accordance with the subject invention.

Polyol B is a polymer polyol containing approximately 21% vinyl polymer solids polymerized in situ, and has a hydroxyl number of 245. Polyol B is commercially available from Lyondell Chemical Co. as Flexure™ 1000 polymer polyol.

Polyol C is a polymer polyol containing 21% by weight of an acrylonitrile polymer dispersed in a glycerine-initiated polyoxypropylene triol capped with ethylene oxide, and having a hydroxyl number of 28.

Formulations and Test Results are presented below in Table I.

| EXAMPLE | 1 | 2 | 3 | 4 | 5 | C1 | C2 |
|---|---|---|---|---|---|---|---|
| POLYOL A | 90 | 90 | 80 | 80 | 60 | — | — |
| POLYOL B | 10 | 10 | 20 | 20 | 40 | — | — |
| POLYOL C | — | — | — | — | — | 100 | 100 |
| ethylene glycol | — | — | — | — | — | 7.0 | 7.0 |
| dibutylin dilaurate | — | — | — | — | — | 0.02 | 0.02 |
| triethylene diamine | — | — | — | — | — | 0.20 | 0.02 |
| A-107 | 0.60 | 0.60 | 0.60 | 0.55 | 0.55 | — | — |
| water | 1.50 | 1.25 | 1.25 | 0.57 | 0.39 | 3.0 | 3.0 |
| polymeric MDI (31.3–31.5% FNCO) | 33.23 | 29.43 | 34.91 | 24.58 | 32.80 | 85.24 | 85.24 |
| solids total % | 28.2 | 29.1 | 26.4 | 28.7 | 24.03 | 10.8 | 10.8 |
| core density (kg/m$^3$) | 66.6 | 76.2 | 71.6 | 149.4 | 186.9 | 89.1 | 88.4 |
| compressive strength (kPa) | 77.9 | 84.8 | 119.3 | 295.1 | 1055 | 288.2 | 301.3 |
| energy managed (J) | 6.7 | 7.0 | 9.2 | 23.7 | 48.9 | 26.1 | 27.5 |
| efficiency E (%) | 83.4 | 81.4 | 85.6 | 75.6 | 79.4 | 84.3 | 84.4 |
| recovery R (%) | 96.4 | 97.2 | 90.9 | 97.2 | 85.0 | 67.6 | 69.6 |
| E + R | 180 | 179 | 177 | 173 | 164 | 152 | 154 |

The results in Table 1 indicate that the energy management foams of the subject invention display excellent energy absorbing efficiency and recovery over a wide range of densities. Comparative Examples C1 and C2 are patterned after Examples 2, 3, and 4 of U.S. Pat. No. 4,212,954. The results indicate that as a function of density, the latter two foams can absorb a considerable amount of energy. However, the energy absorbed and the efficiency are at the expense of recovery, which is less than 70%. Such foams would not be suitable in visible automotive components, as the foams would exhibit noticeable indentations after their first impact, and be unavailable at their designed energy absorbtion capacity for occupant protection in a subsequent severe impact. The sum of E+R averages 153, but recovery, again, is deficient.

The subject invention foams all exhibit recoveries greater than 85%, with recoveries in excess of 90% being common. At the same time, the efficiency remains high. The sum E+R is in each case greater than 160 while maintaining recovery higher than 80%. Most foams have E+R values greater than 170.

The subject invention may be practiced with any individual combination of ingredients which satisfy the necessary ingredient requirements, to the exclusion of other ingredients, whether named or unnamed, and whether optional or an individual example of a required group of ingredients. Required ingredients are an isocyanate, a first polyol component, a second polyol component, and a total dispersed polymer solids content of 15 weight percent or more. The invention, for example, may be practiced to the exclusion of chain extenders, crosslinkers, and other polyols, if desired.

By the term "efficiency/recovery factor" is meant the sum of efficiency and recovery expressed as percents and as measured herein. The efficiency/recovery factor is expressed as a number without a percentage symbol. By the term "total vinyl solids" and similar terms is meant the weight percent of all vinyl polymer particles present as the dispersed phase of the polymer polyols used herein, relative to the total weight of the curable composition, or to the total weight of foam produced from the composition, which are substantially the same. By the term "isocyanate-terminated" with respect to prepolymers and quasi-prepolymers is meant the reaction product of a stoichiometric excess of di- or polyisocyanate with a di- or higher functionality polyether polyol having a molecular weight greater than 300 Da, or in excess of 10 weight percent of a higher molecular weight polyol. For example, urethane-modified MDI, which is of a well defined, low molecular weight, is not a prepolymer or quasi-prepolymer as those terms are viewed by those skilled in the art.

Having now fully described the invention, it will be apparent to one of ordinary skill in the art that many changes and modifications can be made thereto without departing from the spirit or scope of the invention as set forth herein.

What is claimed is:

1. A rigid polyurethane energy management foam having a density of from 30 kg/m$^3$ to about 270 kg/m$^3$, an energy absorbing efficiency at 40% compression greater than 70%, a recovery after 80% compression of greater than 80%, and an efficiency/recovery factor greater than 150, wherein said foam is the cellular reaction product at an isocyanate index of about 90 to about 130, of one or more di- and/or polyisocyanates with a polyol composition comprising:

a) a first polyol component having a nominal functionality of about 2.5 or more and a minimum molecular weight of about 3000 Da;

b) a second polyol component having a nominal functionality of about 3.0 to about 6.0 and a hydroxyl number from about 160 to about 800, said second polyol component constituting about 1 weight percent or more of total polyol;

said polyol composition containing sufficient vinyl polymer polyol solids so as to yield a total vinyl solids content relative to the total weight of said foam of about 15 weight percent or more, said vinyl polymer solids having an average styrene to acrylonitrile weight ratio greater than one.

2. The energy management foam of claim 1 wherein said foam is prepared by a one-shot process.

3. The energy management foam of claim 1, wherein said di- or polyisocyanate comprises one or more isocyanates selected from the group consisting of toluene diisocyanate, methylenediphenylene diisocyanate, polymethylenepolyphenylene polyisocyanate, and urethane-, urea-, biuret-, carbodiimide-, allophanate-, uretonimine-, uretdione-, or isocyanurate-modifications of these isocyanates.

4. The energy management foam of claim 3 wherein said di- or polyisocyanate is devoid of isocyanate-terminated prepolymers.

5. The energy management foam of claim 1, wherein said one or more di- and/or polyisocyanates comprises polymethylene polyphenylene polyisocyanate and wherein said vinyl polymer solids content is minimally 20% based on the weight of the foam.

6. The energy management foam of claim 1, wherein said total vinyl solids content is about 20% by weight or higher.

7. The energy management foam of claim 1, wherein said total vinyl solids content is about 25% by weight or higher.

8. In a manufactured component containing an energy management foam, the improvement comprising selecting as said energy management foam the energy management foam of claim 1.

9. In a manufactured component containing an energy management foam, the improvement comprising selecting as said energy management foam the energy management foam of claim 2.

10. In a manufactured component containing an energy management foam, the improvement comprising selecting as said energy management foam the energy management foam of claim 3.

11. In a manufactured component containing an energy management foam, the improvement comprising selecting as said energy management foam the energy management foam of claim 4.

12. In a manufactured component containing an energy management foam, the improvement comprising selecting as said energy management foam the energy management foam of claim 5.

13. In a manufactured component containing an energy management foam, the improvement comprising selecting as said energy management foam the energy management foam of claim 6.

14. In a manufactured component containing an energy management foam, the improvement comprising selecting as said energy management foam the energy management foam of claim 7.

15. The component of claim 8, wherein said energy management foam is the cellular reaction product of one or more di- or polyisocyanates with a polyol composition comprising a first polyol component which comprises a polymer polyol having from about 20 weight percent to about 50 weight percent vinyl polymer solids as a dispersed phase and a number average molecular weight of from about 3000 Da to about 8000 Da; and a second, low molecular weight polyol having a hydroxyl number from about 200 to about 800 Da, wherein the total vinyl polymer solids content of said foam is in excess of about 25 weight percent.

16. The energy absorbing foam of claim 1 which is foamed within a trim layer of textile, vinyl, or leather.

* * * * *